United States Patent [19]

Williams et al.

[11] Patent Number: 4,501,295

[45] Date of Patent: Feb. 26, 1985

[54] TRANSFER VALVE

[76] Inventors: H. Jay Williams, 944 Northgate Dr., Allison Park, Pa. 15101; Raymond Yauneridge, 605 Cherry St., Windber, Pa. 15963

[21] Appl. No.: 368,300

[22] Filed: Apr. 14, 1982

[51] Int. Cl.³ ............................................ F16K 11/02
[52] U.S. Cl. ........................... 137/625.19; 137/599.1; 137/625.29; 137/625.32; 251/160; 251/188
[58] Field of Search ..................... 137/595, 599.1, 601, 137/625.19, 625.23, 625.29, 625.32, 625.47; 210/340, 341; 251/160, 188, 192

[56] References Cited

U.S. PATENT DOCUMENTS

| 156,087 | 10/1874 | Higgs . | |
|---|---|---|---|
| 1,288,257 | 12/1918 | Stewart | 210/341 X |
| 1,685,303 | 9/1928 | Voorheis | 210/340 |
| 3,116,755 | 1/1964 | McNeal | 137/601 |
| 3,190,584 | 6/1965 | Gire et al. | 244/52 |
| 3,394,735 | 7/1968 | Wurster | 137/625.32 |
| 3,471,021 | 10/1969 | Prizler | 210/169 |
| 3,572,507 | 3/1971 | Juskevic | 210/340 |
| 4,222,413 | 9/1980 | Wulf | 137/637.3 |

FOREIGN PATENT DOCUMENTS 2501568 7/1976 Fed. Rep. of Germany ...... 251/160
94936 9/1959 Norway ............................. 251/188

Primary Examiner—Robert G. Nilson
Attorney, Agent, or Firm—Webb, Burden, Robinson & Webb

[57] ABSTRACT

A transfer valve having a valve casing with a closed bottom, a closed top and a separator plate dividing the interior of the valve casing into an upper chamber and a lower chamber. An inlet port opening into the upper chamber, an outlet port opening into the lower chamber and two additional ports opening into both the upper chamber and into the lower chamber. A valve in the upper chamber and a valve in the lower chamber, and a control rod extending through the upper and lower plates to simultaneously rotate the valve from one of the additional ports in the upper chamber and in the lower chamber to the other additional port in the upper chamber and in the lower chamber. A linkage between the control rod and each valve to open and close the valves by axial movement of the control rod so that fluid entering the upper chamber through the inlet port may flow out of one of the additional ports in the upper chamber and may enter the lower chamber through one of the additional ports in the lower chamber and exit from the lower chamber through the outlet port.

5 Claims, 7 Drawing Figures

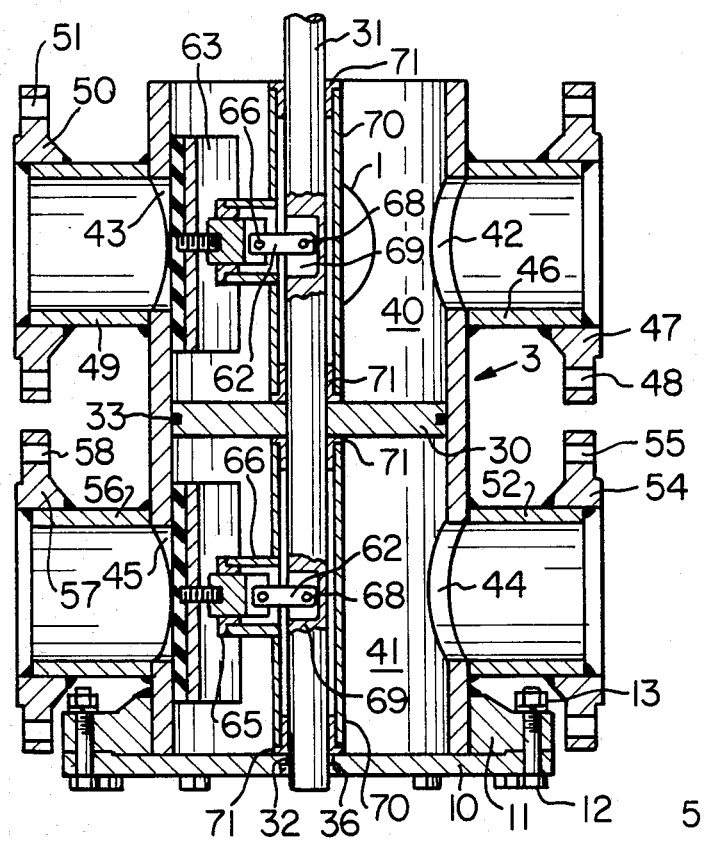

4,501,295

TRANSFER VALVE

BACKGROUND OF THE INVENTION

1. Field of the Invention

The invention is directed to a transfer valve for use in a system wherein a fluid must be diverted from one work load to a second work load while maintaining uninterrupted operation of the system. An example of such a system is a filter strainer circuit or a heat exchanger circuit wherein one unit must be cleaned or repaired without interrupting the operation of the overall system. Generally speaking, any system which includes a standby unit which must be intermittently integrated into the system to maintain continuous operation of the system will advantageously incorporate the transfer valve of the invention.

2. Description of the Prior Art

Transfer valves presently in use are generally double plug valves or ball valves with two downstream check valves to isolate return flow. Plug valves tend to freeze after remaining in one position for a long period of time, and in an attempt to minimize this problem, a lubricant is used on a continuous basis. Additionally, a plug valve requires a substantial turning torque on the valve actuator to change the position of the plug in the valve casing due to the extremely large frictional drag on the plug surface when it is moved relative to the valve casing. Furthermore, a plug valve operates relatively slowly so that there is a substantial pressure drop in the system when the plug is adjusted. The design and the large amount of torque required to operate a plug valve limit the practical size of such a valve especially in a double three way arrangement to approximately a six inch valve which is not large enough for many commercial installations. A ball valve will have the same basic deficiencies as a plug valve and, therefore, is not a practical substitute for installations requiring large valves.

SUMMARY OF THE INVENTION

The invention is a transfer valve which may be installed in on-line systems which must be operated on a continuous basis. The valve has a sealing arrangement which results in zero leakage through the closed ports. Vertically spaced ports are located one above the other in the valve casing in separate chambers and are angularly spaced from an identical pair of vertically spaced ports. Flow is controlled from the inlet of the valve to work load in a continuous fluid system and back to the outlet of the valve while another work load in the continuous system is shut off for repair, cleaning etc. without interrupting the operation of the system.

BRIEF DESCRIPTION OF THE DRAWINGS

FIG. 3 is a section on line III—III of FIG. 2;

FIG. 4 is a section on line IV—IV of FIG. 3;

FIG. 6 is a plan view of the valve; and

DESCRIPTION OF THE PREFERRED EMBODIMENT

Figure 1:
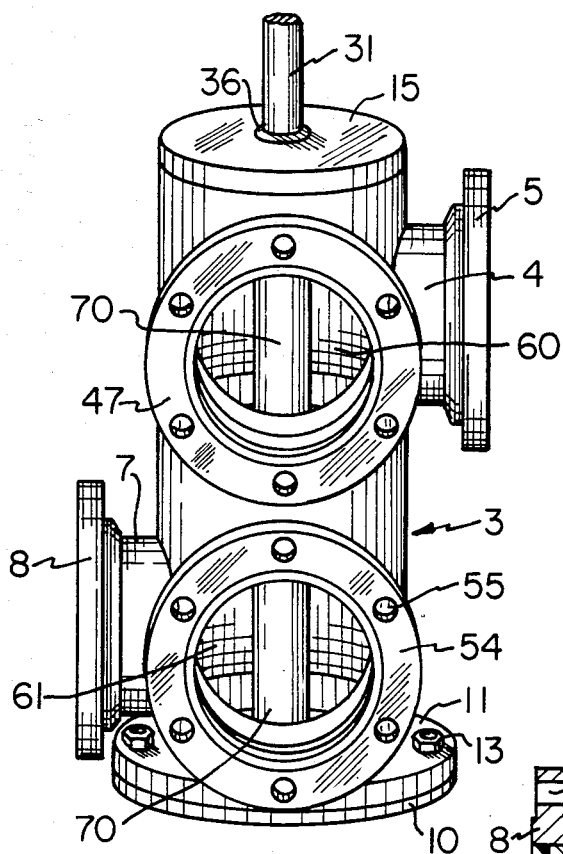
FIG. 1 is a perspective view of a transfer valve according to the invention.
Figure 2:
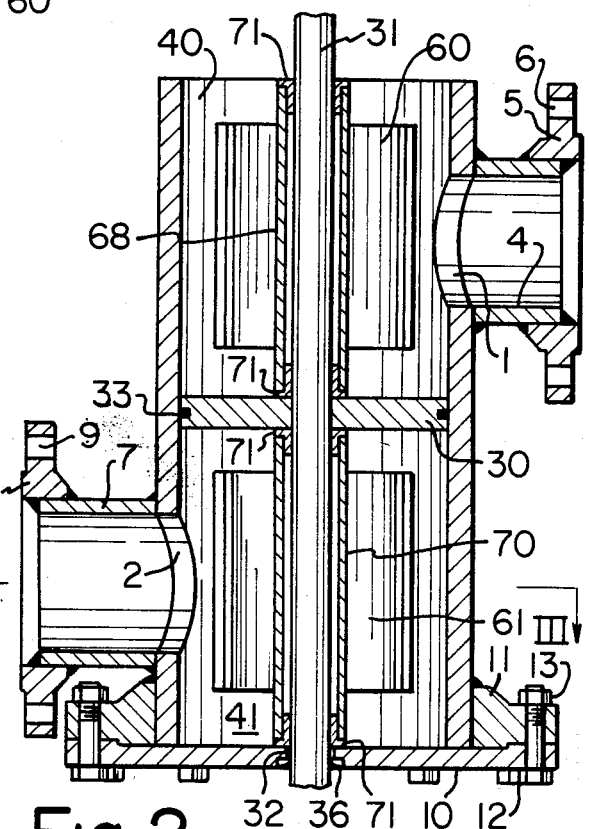
FIG. 2 is a vertical section through the valve shown in FIG. 1.
Figure 7:
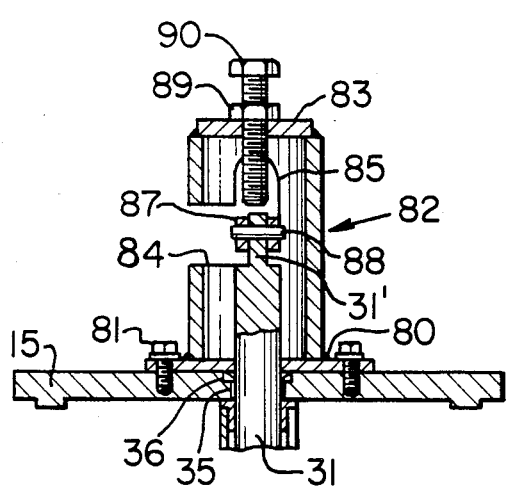
FIG. 7 is a vertical section through the valve actuator.

With reference to FIGS. 1 and 2 of the drawings, the transfer valve has an inlet port 1 and an outlet port 2 formed in valve casing 3. The inlet port and the outlet port are angularly spaced approximately 180° from each other. The inlet port is located in the upper portion of the valve casing, and the outlet port is located in the lower portion of the valve casing. A stub pipe 4 is welded to the exterior of valve casing 3 at inlet port 1, and an annular flange 5 having angularly spaced bolt holes 6 is welded to the outer end of stub pipe 4 for connection to a fluid system. A stub pipe 7 is welded to the exterior of valve casing 3 at outlet port 2, and an annular flange 8 having angularly spaced bolt holes 9 is welded to the outer end of stub pipe 7 for connection to a fluid system. Valve casing 3 includes a bottom plate 10 which is bolted to an annular flange 11 welded to the lower end of valve casing 3 by bolts 12 having nuts 13 on their threaded end. Valve casing 3 has a cover plate 15 which will be connected to valve casing 3 by a commercially available Victaulic seal coupling. As is well known to those skilled in the art, this is a clamp type coupling with an internal compressible gasket. Bottom plate 10 may also be attached to valve casing 3 by a Victaulic coupling in which case flange 13 and the nuts and bolts will be eliminated.

A circular separator plate 30 is located approximately midway between the top and the bottom of valve casing 3 and divides the interior of the valve casing into an upper chamber and a lower chamber. A flexible O-ring seal 33 is located between the edge of plate 30 and the inner surface of valve casing 3 to prevent fluid flow between the upper and lower chambers. A rotatable and vertically movable control rod 31 extends through a central aperture in plate 30 and is welded to the plate. Rod 31 extends upwardly from an opening 32 located at the center of bottom plate 10. The upper end of control rod 31 extends out of valve casing 3 through a centrally located opening 35 in cover plate 15. Opening 32 in bottom plate 10 and opening 35 in cover plate 15 are each provided with a seal 36 to prevent leakage from the interior of valve casing 3 adjacent control rod 31.

Separator plate 30 divides the interior of valve casing 3 into the upper chamber 40 and the lower chamber 41. Upper chamber 40 is in communication with inlet port 1 and is provided with a pair of ports 42 and 43 which are angularly spaced from each other by approximately 180° and from inlet port 1 by approximately 90°. Lower chamber 41 is in communication with outlet ports 2 and is provided with a pair of ports 44 and 45 which are angularly spaced from each other by approximately 180° and from outlet port 2 by approximately 90°. Ports 42 and 44 are vertically aligned, and ports 43 and 45 are vertically aligned. Since upper ports 42 and 43 are in fluid communication with upper chamber 40, and lower ports 44 and 45 are in fluid flow communication with lower chamber 41, fluid which flows into chamber 40 through inlet port 1 can flow out of either port 42 or port 43 depending upon which port is open and which port is closed by the valve shoe in the upper chamber as described hereinafter. In like fashion one of port 44 or port 45 will be in fluid flow communication with lower chamber 41 depending upon the position of the valve shoe in the lower chamber.

As will be seen in FIG. 4 of the drawings, a stub pipe 46 is welded to the exterior of valve casing 3 in registry with port 42 and is provided with an annular flange 47 having angularly spaced bolt holes 48. A stub pipe 49 is welded to the exterior of valve casing 3 in registry with port 43 and is provided with an annular flange 50 having angularly spaced bolt holes 51. A stub pipe 52 is welded to the exterior of valve casing 3 in registry with port 44 and is provided with an annular flange 54 having angularly spaced bolt holes 55. A stub pipe 56 is welded to the exterior of valve casing 3 in registry with port 45 and is provided with an annular flange 57 having angularly spaced bolt holes 58. The flanges and bolt holes permit connection of the stub pipes into a continuous fluid system.

Each arcuate valve shoe 60 and 61 is fixed to control rod 31 by an articulated linkage for a purpose to be explained hereinafter. Each linkage has a link 62 which is attached at one end to a slide 63 which threadedly engages one end of a stud 64. The other end of stud 64 is threadedly engaged with an arcuate valve shoe. The threaded connection between the stud and the valve shoe makes it easy to replace a worn valve shoe when necessary without dismantling the linkage. Slide 63 is partially supported in a bushing 65 located at the end of a collar 66. The other end of link 62 is pinned to control rod 31 by a pivot pin 68. The end of link 62 pinned to control rod 31 is located in a slot 69 to permit the link to pivot on pin 68. Control rod 31 is surrounded by a pair of sleeves 70 which are spaced from the control rod by bushings 71 located at each end of both sleeves. A collar 66 is attached to each sleeve 70 and extends at a right angle therefrom and loosely surrounds a portion of link 62 to act as a guide for the link. Control rod 31 and sleeves 70 are rotated about their common axis to position the shoes relative to ports 42, 43, 44 and 45. The valve shoes are sized and positioned so that they will completely close a pair of vertically aligned ports, either ports 43 and 45 or ports 42 and 44. The arcuate valve shoes are made of resilient polyurethane, and the faces are contoured to be complementary with the inside curvature of the inner surface of valve casing 3 so that when the valve shoes are in sealing engagement with the inner surface of the valve body surrounding the ports, a zero leakage seal is effected. The valve shoes can also be made of metal with a facing of a resilient polyurethane to act as the closure member.

The individual linkages operate to retract shoes 60 and 61 from contact with the inner surface of valve casing 3 when control rod 31 is raised. When the rod is raised, pivot pins 68 move the ends of links 62 upwardly which pulls the links in a direction away from the inner surface of the valve casing. Since the end of each link 62 is attached to a slide 63 which is threaded on a stud 64 attached to a valve shoe, the valve shoe is moved away from and out of contact with the inner surface of valve casing 3 when control rod 31 is raised into the position shown in FIG. 5. Conversely when control rod 31 is moved downwardly, links 62 and slides 63 move toward the inner surface of valve casing 3 to force the surface of shoes 60 and 61 against the inner surface of the valve casing to seal the ports as shown in FIGS. 3 and 4.

Figure 5:
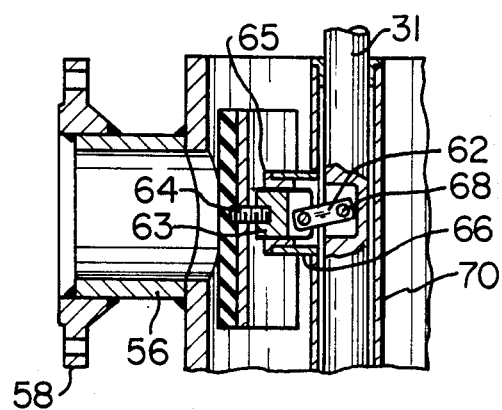
FIG. 5 is a partial view showing a valve shoe in the open position.

The upper end of control rod 31 extends through central opening 35 in cover plate 15 and through a central opening in a base plate 80 as shown in FIG. 5. Base plate 80 is attached to cover plate 15 by a plurality of screws 81. A cylindrical housing 82 is welded to the upper surface of base plate 80 and a cap plate 83 is welded at its upper end. Cylindrical housing 82 receives the upper end of control rod 31. Cylindrical housing 82 has an arcuate slot 74 which extends around slightly more than 180° of its periphery. Each end of slot 74 is connected with a vertical upwardly extending notch 85. The center line of one notch 85 is aligned with the vertical center line of ports 42 and 44, and the center line of the other notch 85 is aligned with the vertical center line of ports 43 and 45. The upper end of control rod 31 is formed with a flattened portion 31', and one end of a lever 86 is in the form of a clevis 87 and is pinned to flattened portion 31' by a pivot pin 88. The lever may be rotated through 180° in slot 74 to adjust the position of the valve shoes by lowering the lever out of a notch 85 to slightly raise the control rod to free shoes 60 and 61 from contact with the inner surface of valve casing 3 and moving the lever through the full length of slot 74 at which point the lever is raised into the other notch 85 to force control rod 31 downwardly to tightly position the faces of shoes 60 and 61 against the inner surface of valve casing 3 into the sealing position for either vertically aligned ports 42 and 44 or vertically aligned ports 43 and 45.

A threaded nut 89 is welded to the top surface of cap plate 83, and a threaded holddown bolt 90 is threadedly engaged with nut 89. The holddown bolt extends through the nut and through an aligned opening in cap plate 83 so that when the bolt is tightened, its lower end contacts the upper end of control rod 31 to hold the rod down and to simultaneously hold the faces of shoes 60 and 61 in sealing engagement with the inner surface of valve casing 3 to close a set of vertically aligned ports.

The transfer valve functions in the following manner to control the flow of fluid in a system to a work station such as a heat exchanger, a filter or a chemical or waste processing unit. Fluid enters upper chamber 40 through inlet port 1 and flows out of chamber 40 through either port 42 or 43 depending upon the position of valve shoe 60 and passes to a work station in the system. The fluid returns from the work station and enters lower chamber 41 through either port 44 or port 45 depending upon whether the fluid exited chamber 40 through port 44 or port 43. The fluid then flows out of lower chamber 41 through outlet port 2 to a fluid line in the system.

It will be seen that while the fluid is flowing through the ports 42 and 44, for example, the faces of the valve shoes will be in sealing relation with ports 43 and 45 by means of the mechanical lock arrangement explained above so that the work station connected with these ports may be cleaned, repaired, etc. To transfer the flow from ports 42 and 44 to ports 43 and 45 it is a simple matter to loosen holddown bolt 90, lower lever 86 and rotate control rod 31 in arcuate slot 74 to move the valve shoes 60 and 61 from ports 43 and 45 to ports 42 and 44, thereby closing ports 42 and 44 and opening ports 43 and 45.

When control rod 31 is raised by lowering lever 86, valve shoes 60 and 61 are backed off slightly from the inner surface of the valve body by the linkages which connect the control rod to the valve shoes. The valves shoes will then be in the position shown in FIG. 5 of the drawings. This permits the valve shoes to be simultaneously rotated 180° without any frictional contact with the inner surface of valve casing 3, thereby requiring only a minor amount of torque. The shoes are locked into the sealing position shown in FIGS. 3 and 4 of the drawings by raising lever 86 into a notch 85 which moves control rod 31 downwardly and extends the linkages connecting control rod 31 and valve shoes 60 and 61. Since each valve shoe has a flexible polyurethane face, the valve has zero internal leakage through the sealed ports at positive pressures up to approximately 300 psi without the necessity of lubrication. Furthermore, the valve shoes are easily and inexpensively replaced when necessary.

The overcam mechanical lock design provides a low pressure drop profile which results in an overall compact valve. The valve has a number of advantages over existing valves such as a low torque requirement for adjustment and a positive mechanical unlock and lockdown. Additionally, the valve has zero leakage and a low pressure drop. The valve requires no lubricant which is important since the operator need not be concerned about the valve becoming dry.

The transfer valve may be used as an integral diversion valve in a filter strainer or a heat exchanger circuit to enable one unit to be repaired or cleaned without interrupting the flow through the system or requiring the process to be shut down. However, it will be understood by those skilled in the art that other applications wherein a standby unit must be integrated into an on-line system to maintain continuous flow is an ideal setting for the transfer valve of the invention. Additionally, by removing the portion of the unit below plate 30, the valve may be converted into a standard three way valve to replace three way plug valves and ball valves which are used in other applications where single flow diversion is required.

While a preferred embodiment of the invention has been described herein, it is to be understood that it may be embodied within the scope of the appended claims.

We claim:

1. A transfer valve including a substantially cylindrical valve casing, a bottom plate closing the bottom of said valve casing, a cover plate closing the top of said valve casing, a separator plate within said valve casing separating the upper portion of said valve casing from the lower portion of said valve casing to form an upper chamber and a lower chamber within said valve casing, a first port formed in said valve casing opening into said upper chamber, a second port formed in said valve casing opening into said lower chamber, two additional ports formed in said valve casing opening into said upper chamber and two additional ports formed in said valve casing opening into said lower chamber, each additional port opening into said upper chamber being vertically aligned with an additional port opening into said lower chamber, shoe valve means in said upper chamber and shoe valve means in said lower chamber, actuator means connected to said shoe valve means in both said upper chamber and said lower chamber to simultaneously rotate said shoe valve means in said upper chamber and said shoe valve means in said lower chamber from one of said two additional ports opening into said upper chamber and into said lower chamber to the other of said two additional ports opening into said upper chamber and into said lower chamber, a non-resilient linkage connecting said actuator means to said shoe valve means in said upper chamber and a non-resilient linkage connecting said actuator means to said shoe valve means in said lower chamber to move said shoe valve means in said upper and lower chambers toward and away from an additional port in said upper chamber and an additional port in said lower chamber to open and close said two additional ports, said actuator means including a vertically and rotationally movable control rod located centrally of said valve casing and having an upper end extending through said cover plate, a lever attached to said upper end of said control rod for rotating said rod to move said shoe valve means in said upper chamber and said shoe valve means in said lower chamber between said two additional ports in said upper chamber and between said two additional ports in said lower chamber and for moving said control rod vertically to operate said non-resilient linkages to move said shoe valve means toward and away from two additional ports to open and close an additional port in said upper chamber and an additional port in said lower chamber, a cylindrical member extending upwardly from the upper surface of said cover plate and surrounding the upper end of said control rod, said cylindrical member having an arcuate slot formed therein extending through approximately 180° of its periphery, and a notch formed in said cylindrical member extending upwardly from each end of said arcuate slot and vertically aligned with the center line of an additional port in said upper chamber and the vertically aligned additional port in said lower chamber, said lever extending out of said cylindrical member through said arcuate slot, whereby movement of said lever from said notch at one end of said arcuate slot to said notch at the other end of said arcuate slot rotates said control rod and said shoe valve means from one of said additional ports in said upper chamber and the vertically aligned additional port in said lower chamber to the other additional port in said upper chamber and the vertically aligned additional port in said lower chamber so that said shoe valve means in said upper and lower chambers can simultaneously close one of said additional ports opening into said upper chamber and the vertically aligned additional port opening into said lower chamber so that fluid entering said upper chamber through said first port may flow out of the open additional port opening into said upper chamber and may enter said lower chamber through the open additional port opening into said lower chamber and exit from said lower chamber through said second port.

2. A transfer valve as set forth in claim 1 including a cap plate on the upper end of said cylindrical member and lock means extending through said cap plate to lock said control rod in position when said shoe valve means are located in the desired position within said valve casing.

3. A transfer valve as set forth in claim 2 wherein said lock means is a bolt threadedly connected with said cap plate and contacting the upper end of said control rod.

4. A valve as set forth in claim 1 wherein said shoe valve means in said upper chamber and said shoe valve means in said lower chamber are identical and each shoe valve means includes a shoe with a resilient contact surface having a curvature complementary with the curvature of the inner surface of said cylindrical valve casing, whereby said resilient contact surfaces contact the inner surface of said valve casing at the periphery of two additional ports to seal said ports when said shoe valve means in said upper chamber and said shoe valve means in said lower chamber are closing one of said two additional ports in said upper chamber and one of said two additional ports in said lower chamber.

5. A transfer valve as set forth in claim 4 wherein said resilient material is polyurethane.

* * * * *